(12) United States Patent
McLane et al.

(10) Patent No.: US 9,232,225 B2
(45) Date of Patent: Jan. 5, 2016

(54) LOW COMPLEXITY AND MEMORY EFFICIENT IMAGE CODEC

(71) Applicant: CHIRP INC., Chatsworth, CA (US)

(72) Inventors: Daniel Perrine McLane, Bell Canyon, CA (US); Chunmei Kang, Maple Grove, MN (US); Brian Nutter, Lubbock, TX (US); Bian Li, Dallas, TX (US)

( * ) Notice: Subject to any disclaimer, the term of this patent is extended or adjusted under 35 U.S.C. 154(b) by 106 days.

(21) Appl. No.: 14/213,764

(22) Filed: Mar. 14, 2014

(65) Prior Publication Data

US 2014/0307976 A1 Oct. 16, 2014

Related U.S. Application Data

(60) Provisional application No. 61/785,273, filed on Mar. 14, 2013.

(51) Int. Cl.
| | |
|---|---|
| G06K 9/36 | (2006.01) |
| H04N 19/124 | (2014.01) |
| H04N 19/64 | (2014.01) |
| H04N 19/132 | (2014.01) |
| H04N 19/18 | (2014.01) |
| H04N 19/169 | (2014.01) |

(52) U.S. Cl.
CPC ........... *H04N 19/124* (2014.11); *H04N 19/132* (2014.11); *H04N 19/18* (2014.11); *H04N 19/1883* (2014.11); *H04N 19/647* (2014.11)

(58) Field of Classification Search
CPC .......... H04N 19/00927; H04N 19/124; H04N 19/132; H04N 19/18; H04N 19/647; H04N 19/1883; H04N 7/26563; H04N 7/26579; H04N 7/26393; H04N 7/2651; G06T 9/007
See application file for complete search history.

(56) References Cited

U.S. PATENT DOCUMENTS

| | | | | |
|---|---|---|---|---|
| 6,359,928 | B1 * | 3/2002 | Wang ................... | H04N 19/147 375/240.05 |
| 6,519,284 | B1 * | 2/2003 | Pesquet-Popescu . | H04N 19/647 375/240.11 |
| 6,650,782 | B1 * | 11/2003 | Joshi ....................... | G06T 9/005 375/E7.04 |
| 6,760,481 | B1 * | 7/2004 | Chebil .................. | H04N 19/647 375/E7.072 |
| 6,801,665 | B1 * | 10/2004 | Atsumi .................. | H04N 19/70 375/E7.056 |
| 6,876,772 | B2 * | 4/2005 | Fukuhara ............... | H04N 19/63 341/94 |

(Continued)

OTHER PUBLICATIONS

Le Gall & Tabatabai, "Sub-band Coding of Digital Images Using Symmetric Short Kernel Filters and Arithmetic Coding Techniques",Apr. 1998,pp. 761-764,IEEE Transactions.

(Continued)

*Primary Examiner* — Amir Alavi
(74) *Attorney, Agent, or Firm* — Brooks Acordia IP Law, P.C.; Pejman Yedidsion

(57) ABSTRACT

Systems, devices, and methods for encoding a plurality of images by an encoder where the encoder determines a set of subbands associated with an input image, determines a set of wavelet coefficients associated with each subband, generates a wavelet tree comprising a set of nodes and a maximum quantization level for a set of descendants of the set of nodes of the wavelet tree. Then, determines if the maximum quantization level is less than a threshold and sets the wavelet coefficient to zero if it is not, otherwise encodes the maximum quantization level, and encodes the set of wavelet coefficients for transmission in a bit stream comprising the encoded maximum quantization level and the encoded set of wavelet coefficients.

11 Claims, 11 Drawing Sheets

(56) References Cited

U.S. PATENT DOCUMENTS

| | | | |
|---|---|---|---|
| 6,985,632 B2* | 1/2006 | Sato | G06T 5/10 375/240.18 |
| 7,006,568 B1* | 2/2006 | Gu | H04N 19/46 348/472 |
| 8,107,755 B2* | 1/2012 | Hosaka | H04N 19/63 348/398.1 |
| 2003/0099298 A1 | 5/2003 | Rose et al. | |
| 2004/0073692 A1 | 4/2004 | Gentle et al. | |
| 2013/0007567 A1 | 1/2013 | Singh et al. | |

OTHER PUBLICATIONS

Guo,Mitra,Karp,& Nutter,"A Resolution-and Rate-Scalable Image Subband Coding Scheme with Backward Coding of Wavelet Trees",Dec. 2006,pp. 442-445,IEEE Asia Pacific Conference.

Guo,Hughes,Mitra, & Nutter,"Ultra High Resolution Image Coding and ROI Viewing Using Line-Based Backward Coding of Wavelet Trees (L-BCWT)",May 2009,pp. 1-4,IEEE Picture Coding.

Linning, Ye, M.S.,"Fast and Low Memory Usage Coding for Image and Video Based on Wavelet Transform",2007, Doctoral dissertation, Texas Tech University.

Ye,Guo,Nutter,& Mitra,"Low-memory-usage image coding with line-based wavelet transform", Feb. 2011, Optical Engineering vol. 50(2), 027005.

Ye,Guo,Nutter,& Mitra,"Memory-Efficient Image Codec Using Line-based Backward Coding of Wavelet Trees",2007, pp. 213-222, IEEE Data Compression Conference.

International Search Report for Serial No. PCT/US14/42420 mailed Oct. 23, 2014.

Shapiro, J.M., "Embedded Image Coding Using Zerotrees of Wavelet Coeffocients", Dec. 1993, pp. 3445-3462, vol. 41, No. 12, IEEE Transactions on Signal Processing.

Said, A. & Pearlman, W.A."A New,Fast,and Efficient Image Codec Based on Set Partitioning in Hierarchical Trees",Jun. 1996,pp. 243-250,vol. 6,No. 3,IEEE Transactions on Circuits.

"Information technology—JPEG 2000 image coding system:Core coding system",Aug. 2002, ITU-T, T.800, ISO/IEC 15444-1.

Chrysafis & Ortega,"Line-Based,Reduced Memory,Wavelet Image Compression",Mar. 2000,vol. 9,No. 3,pp. 378-389,IEEE Transactions on Image Processing.

Taubman, D.S.& Marcellin, M.W.,JPEG2000:Image compression fundamentals, practice and standards, 2002, pp. 420-436, Kluwer Academic Publishers,Massachusetts.

Taubman, David,"EBCOT:Embedded Block Coding with Optimized Truncation", Oct. 21, 1998, ISO/IEC/JTC 1/SC 29/WG 1 N1020R.

Cosman, P.& Zeger, K., "Memory Constrained Wavelet Based Image Coding",Sep. 1998, pp. 221-223, vol. 5, No. 9,IEEE Signal Processing Letters.

Chang, Lee, Peng, & Chen-Yi, "A Line-Based Memory Efficient and Programmable Architecture for 2D DWT using Lifting Scheme", pp. 330-333, vol. 4, 2001, IEEE.

Guo,Mitra,Nutter,& Karp, "A Fast and Low Complexity Image Codec based on Backward Coding of Wavelet Trees",2006,pp. 292-301,IEEE Proceedings of the Data Compression Conference.

Said & Pearlman "An Image Multiresolution Representation for Lossless and Lossy Compression",Sep. 1996,pp. 1303-1310, vol. 5,No. 9, IEEE Transactions on Image Processing.

* cited by examiner

LOW COMPLEXITY AND MEMORY EFFICIENT IMAGE CODEC

CROSS-REFERENCE TO RELATED APPLICATIONS

This application claims priority to and the benefit of Provisional Patent Application No. 61/785,273 filed Mar. 14, 2013, the contents of which is hereby incorporated by reference herein in its entirety and for all purposes.

BACKGROUND

Wavelet-tree-based coding techniques are widely used in existing image encoding/decoding devices, i.e., CODECs, because of the excellent energy-compacting capability and high flexibility in terms of scalability in resolution and distortion. A common feature of such algorithms is to exploit the wavelet tree structure to build dependencies between wavelet coefficients so as to effectively encode the coefficients. For example, an embedded zero-tree wavelet (EZW) algorithm and a set partitioning in hierarchical trees (SPIHT) algorithm are well known representations of such techniques. These exemplary algorithms provide competitive rate-distortion performance with an image compression standard and coding system, e.g., the JPEG2000 standard, but operate with lower system complexity.

A common problem encountered when implementing the wavelet-tree-based algorithms is the large memory consumption from both the wavelet transform and the coding algorithms themselves. The straightforward implementation of two dimensional (2-D) discrete wavelet transform (DWT) must hold the complete image in its buffer. In applications, such as remote sensing and medical imaging, where the image size can be very large, it is very hard to implement the DWT in the hardware. Besides wavelet transform, most wavelet-tree-based coding algorithms themselves require significant memory to store temporary data. The coding procedure requires multiple scans of the same wavelet tree as the algorithm passes through different quantization steps. As a result, these algorithms must retain all the data required to complete these repeated scans and therefore require large amounts of memory.

SUMMARY

Embodiments may include methods, systems, and devices where, for example a method embodiment may include the steps of: (a) receiving a plurality of input images; (b) determining, by an encoder having a processor and memory, a set of subbands associated with an input image of the plurality of input images; (c) determining a set of wavelet coefficients associated with each subband of the plurality of subbands; (d) generating, by the processor, a wavelet tree, the wavelet tree comprising a set of nodes, where each node of the set of nodes of the wavelet tree may be associated with a wavelet coefficient of the set of wavelet coefficients; (e) generating, by the processor, a maximum quantization level for a set of descendants of the set of nodes of the wavelet tree; (f) determining, by the processor, if the maximum quantization level is less than a threshold and then setting the wavelet coefficient to zero if it is not, otherwise encoding the maximum quantization level; (g) encoding the set of wavelet coefficients; and (h) transmitting a bit stream, where the bit stream may comprise the encoded maximum quantization level and the encoded set of wavelet coefficients.

Optionally, the encoded maximum quantization level and the encoded wavelet coefficients may be interleaved in the output bit stream for transmission. In addition, a buffer size used to store inputs to the encoder may be equal to the number of levels of the wavelet transform. Optionally, the buffer size to store a map of the maximum quantization level for a set of descendants of the set of nodes of the wavelet tree is equal to one less, e.g., N−1, than the number of levels of a wavelet transform. In some embodiments, the wavelet coefficients may be encoded with a number of bits proportional to their magnitude level. In other embodiments, in each wavelet tree, energy of a parent may be indicative of energy of the descendants of the parent. Optionally, for each wavelet coefficient of the set of wavelet coefficients, only the bits from the minimum quantization threshold, up to the node value of the wavelet coefficient maximum quantization level of its descendant may be transmitted. In other method embodiments the output bit stream may be reorganized to provide a progressive-resolution decoding feature at a decoder device. In one embodiment, the output bit stream may be partitioned to provide region of interest view at a receiver device and a region of interest control technique may be integrated in the codec device thereby allowing a user to transmit images with layered resolution. Optionally, the encoding the set of wavelet coefficients may be via dividing the coefficients into a block of data.

Embodiments include methods, systems, and devices where, for example a system embodiment may include: (i) an encoding device, having a processor and memory, operably coupled to a decoder via a transport medium, the encoding device configured to: (a) receive a plurality of input images; (b) determine a set of subbands associated with an input image of the plurality of input images; (c) determine a set of wavelet coefficients associated with each subband of the plurality of subbands; (d) generate a wavelet tree, the wavelet tree comprising a set of nodes, wherein each node of the set of nodes of the wavelet tree is associated with a wavelet coefficient of the set of wavelet coefficients; (e) generate a maximum quantization level for a set of descendants of the set of nodes of the wavelet tree; (f) determine if the maximum quantization level is less than a threshold and then set the wavelet coefficient to zero if it is not, otherwise encode the maximum quantization level; and (g) encode the set of wavelet coefficients. The system embodiment may also include (ii) a quantization device configured to perform quantization on the set of wavelet coefficients; (iii) an output interface configured to: (a) generate a bit stream based on a received region of interest control flag and a received scalability control flag; and (b) transmit the generated bit stream, wherein the generated bit stream comprises the encoded maximum quantization level and the encoded set of wavelet coefficients; and (iv) a decoding device configured to decode the received encoded bit stream.

BRIEF DESCRIPTION OF THE DRAWINGS

Embodiments are illustrated by way of example and not limitation in the figures of the accompanying drawings, and in which.

DETAILED DESCRIPTION

Figure 1:
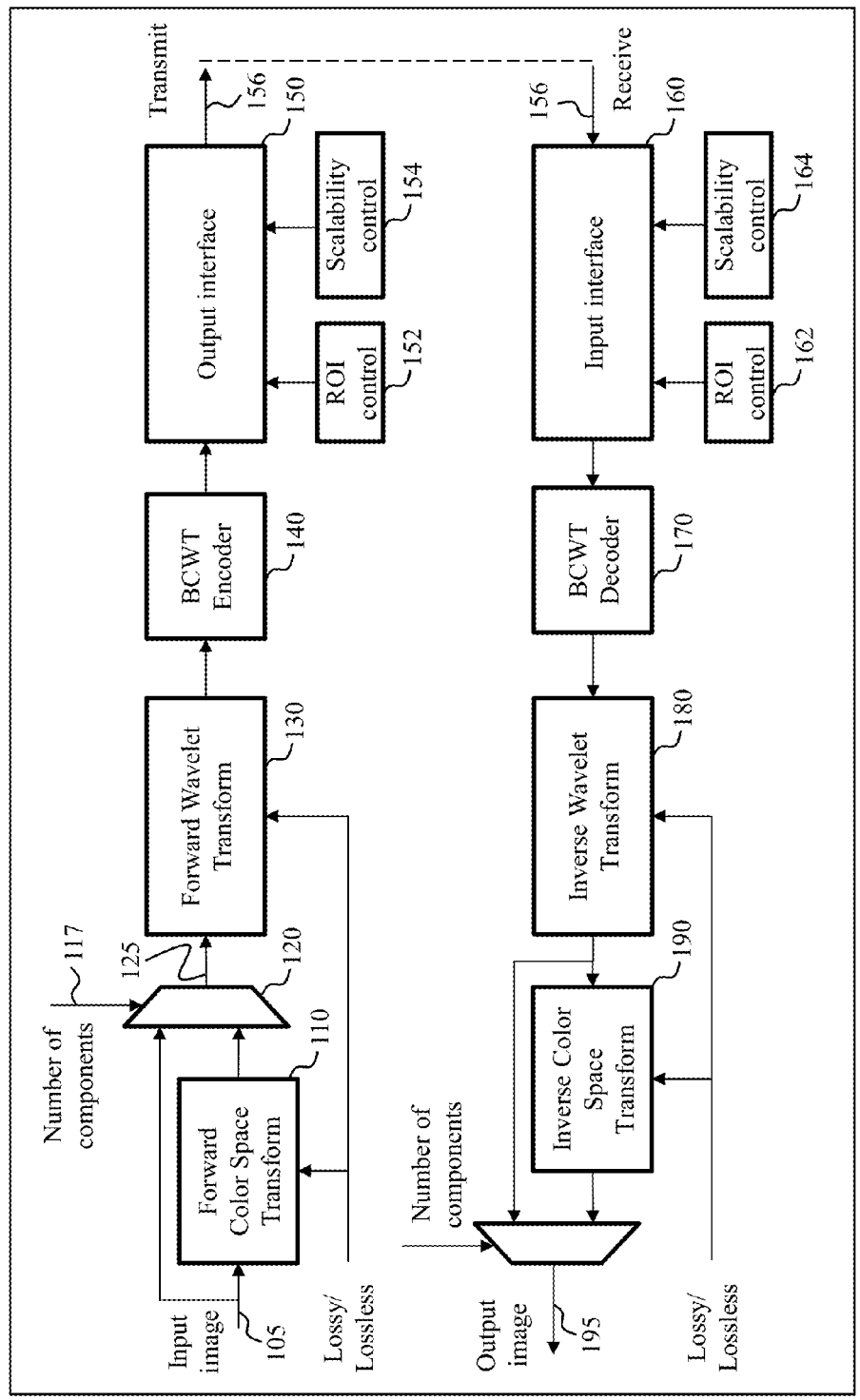
FIG. 1 depicts an exemplary embodiment of the image CODEC showing the system structure in a functional block diagram.

Embodiments of the exemplary image coder-decoder (CODEC) device are configured to execute a memory efficient wavelet-tree-based coding algorithm that at the same time retains a set of features, such as, low complexity and resolution scalability. The embodiments may be developed by way of a memory efficient image CODEC system utilizing a wavelet-tree-based coding algorithm. In one exemplary embodiment, the CODEC is based on backward coding of the wavelet tree (BCWT) allowing the CODEC to efficiently work with line-based wavelet transform without the need for large memory to store the wavelet coefficients from lower levels. This backward coding, instead of "forward" coding wavelet trees from the highest level, i.e., lowest resolution, makes significant reduction in the overall system memory and in particular, as compared to other wavelet-tree-based CODECs, for example, as in embedded zero-tree wavelet (EZW) and set partitioning in hierarchical trees (SPIHT) algorithms.

One embodiment of the BCWT algorithm comprises a one pass coding scheme, where repeated scan of the wavelet tree may not be required, thus low computation complexity and fast encoding times may be achieved. The aforementioned features do not come at the expense of the quality of reconstruction of lossy compression CODECs, i.e., Peak Signal-to-Noise Ratio (PSNR) performance, because of the similarity in BCWT coding principles with other algorithms for image compression.

Embodiments of the CODEC system comprise implementation of both a lossy BCWT based image CODEC and a mathematically perfectly lossless BCWT based image CODEC. A lossless CODEC is of interest in many applications such as digital cinema editing and other high resolution applications in medical, military, and photography. The crucial adjustment for the implementation of a lossless BCWT based CODEC is the implementation of a reversible wavelet transform. Many reversible wavelet transforms, such as variations of integer to integer wavelet transform, exist. In one example, an S+P multi-resolution transform—where S denotes a sequential transform and P denotes a prediction stage—may be incorporated in order to implement lossless compression. In an exemplary JPEG 2000 image coding system, Le Gall 5/3 integer to integer transform may be used where the 5/3 wavelet transform may be used to compute the wavelet coefficients in the lossless BCWT algorithm. The lossless BCWT algorithm may provide comparable compression ratio with much lower memory usage and higher coding speed than other wavelet-based lossless CODECs, including JPEG2000.

Some exemplary embodiments may also comprise features in the CODEC system for image processing such as: resolution scalability and region of interest (ROI). Scalable CODECs allow users to trade off image quality—distortion and dynamic range—to bit rate, and accordingly may be very useful for transmission on band-limited channels. To achieve these features, embodiments of the exemplary CODEC may comprise an ROI and scalability control mechanism. Moreover, there may be minimal additional system complexity introduced and the system may allow users to receive the images with more flexibility, simplicity, and efficiency.

FIG. 1 depicts an exemplary embodiment of an image CODEC system 100 which comprises a compressor and a decompressor and where the system illustrates an exemplary system structure of the image CODEC 100. The compressor may comprise a color space transform 110, a wavelet transform 130, a BCWT encoder 140, and an output interface 150 with ROI control 152 and resolution scalability control 154. The decompressor may comprise an input interface 160 with ROI control 162 and resolution scalability control 164, a BCWT decoder 170, an inverse wavelet transform 180, and an inverse color space transform 190. The compressor of the image CODEC 100 may receive as an input signal, an input image 105, where the input image 105 may, for example, be a raw image data which may comprise either one or three color components based on the nature of the input signal. In an embodiment where the input image 105 comprises one color component, the subsequent color space transform 110 may be bypassed 120 based on the received number of components 117; otherwise, the input signal may be processed by the color space transform block 110. Optionally, the color space transform may, for example, be a forward color space transform. The output of the color space transform 110 may comprise three components; however, the output may comprise reduced color dependencies. Each component may then be processed independently by the subsequent wavelet transform block 130 and the BCWT encoder block 140. The output interface 150 may combine all encoded data into one bit stream 156, proper reorganization of which may be needed for ROI control and scalability control—based on the ROI control 152 input signal and the scalability control 154 input signal. Optionally, the resulting bit stream 156 may then be written to an output file or data store.

In an exemplary embodiment of the decompressor, the decompressor may operate in the exact reverse order of the compressor. That is, the input bit stream 156 may be received and then subsequently parsed. Consequently, and based on whether the ROI control 162 input signal and resolution scalability control 164 input signal is enabled, full or partial, i.e., the entire bit stream or portions of the bit stream, may be processed by the BCWT decoder 170, followed by the inverse wavelet transform 180, and the inverse color space transform 190. The output may then be an output image comprising the reconstructed image pixels 195.

In the exemplary image CODEC embodiment 100, an input signal may be used to select whether a lossy or lossless implementation of the image CODEC is to be implemented. For example, in an embodiment of the lossy implementation, an irreversible color transform (ICT) and Daubechies 9/7 wavelet may be used in the color space transform block 110 and wavelet transform block 130, respectively. These operations may be irreversible because round-off errors, due to fixed-point operation, are likely to be introduced. In an embodiment of the lossless implementation, reversible color transform (RCT) and Daubechies 5/3 wavelet may be used in the color space transform block 110 and wavelet transform block 130, respectively. These operations may be reversible because all transform coefficients are integers.

The below sections provide a detailed overview of the wavelet tree structure and the methodology to backward coding of the wavelet tree.

Wavelet Tree Structure

Figure 2:
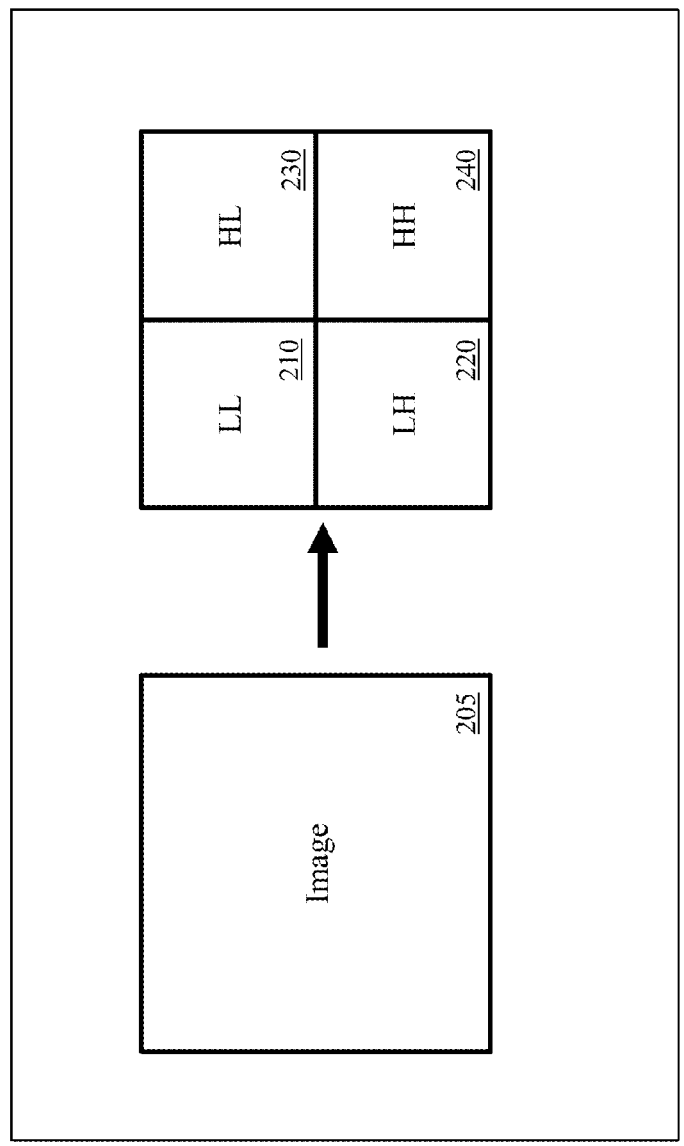
FIG. 2 illustrates in a functional block diagram, a single level 2-D wavelet decomposition.

FIG. 2 illustrates in a functional block diagram, a single level 2-D wavelet decomposition 200. As way of explanatory examples, the wavelet transform may implement a 2-D wavelet decomposition to the input image 205, including one horizontal direction wavelet decomposition followed by one vertical direction wavelet decomposition. The output wavelet coefficients may be split into four subbands as depicted in FIG. 2. The LL subband 210 may comprise the low frequency wavelet coefficients, the LH subband 220 may comprise the vertical details, the HL subband 230 may comprise the horizontal details, and the HH subband 240 may comprise the diagonal details in the image. In one embodiment, a multilevel wavelet transform may be implemented by iteratively decomposing the LL band. The resulting subbands may form a wavelet tree structure, where the top (LL subband) of the wavelet tree may comprise the coarsest information of the image and the bottom of the wavelet tree may comprise the finest information of the image. In the exemplary wavelet tree structure, each wavelet coefficient in a coarser subband may be the parent of four children arranged in the form of a two by two (2×2) block in the finer subband immediately below it.

Figure 3:
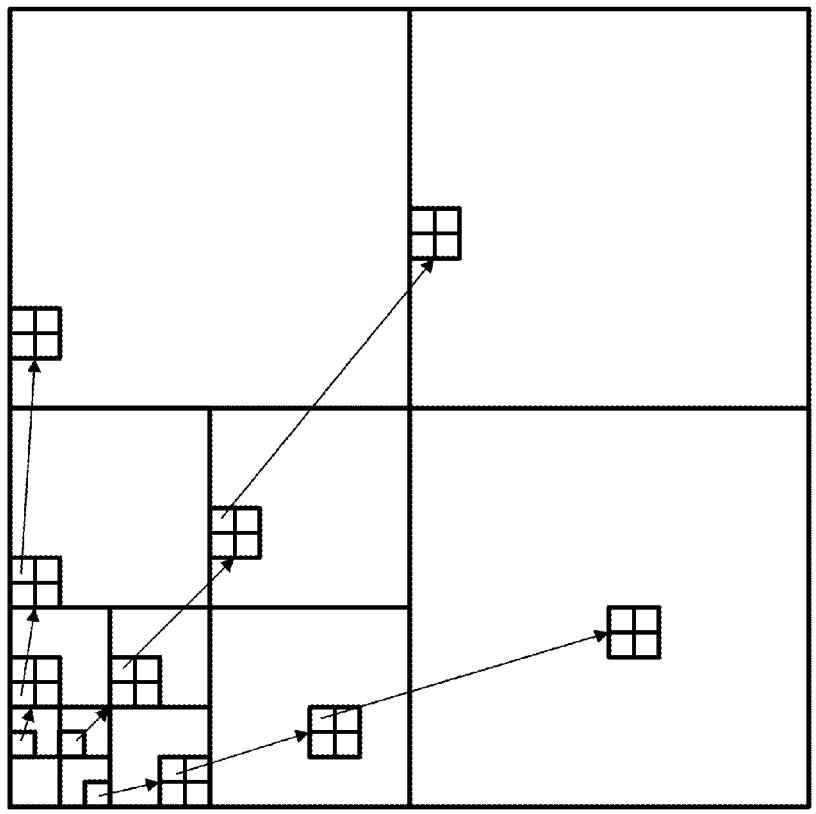
FIG. 3 illustrates an exemplary hierarchical tree structure in multi-level decomposition.

FIG. 3 depicts a wavelet tree structure 300 where each arrow points from a parent to its group of four children. In some embodiments, hierarchical trees may be formed in the decomposition with parent wavelet coefficients constituting nodes of the tree. Typically, exemplary images may contain more energy in the lower frequencies and as a result, coefficients in the lower resolution subband may have large magnitudes where the energy diminishes moving from the top of the wavelet tree to the bottom of the wavelet tree. Accordingly, in each tree, the energy of a parent may be indicative of the energy of the descendants of the parent. The exemplary BCWT coding algorithm of one embodiment may use the abovementioned spatial relationship within the trees to compress the image in the disclosed encoding scheme.

The Mechanism of BCWT Coding Algorithm

1. Building the Map of Maximum Quantization Level of Wavelet Tree Descendants

In an exemplary embodiment of the BCWT algorithm, each wavelet-tree node may store the maximum quantization levels of its descendants (MQD). The MQD map may contain all the MQD of the wavelet tree nodes. In one embodiment, if the wavelet transformed image is, for example, w×h in size, the MQD map is w/2×h/2 in size. In one embodiment, the MQD may be mainly used to select the transmitted bits from the wavelet coefficients. That is, for each wavelet coefficient only the bits from the minimum quantization threshold, up to its MQD node value, may be transmitted. Since the MQD tends to be smaller at the bottom of the wavelet tree and gradually increases until reaching the top, the wavelet coefficients may, for example, be encoded with the number of bits roughly proportional to their magnitude. In some embodiments, the MQD map may then be differentially coded and transmitted as side information. The MQD map may effectively use a low memory space by the CODEC. That is, by storing the quantization level of the magnitude, as opposed to the maximum magnitude of the tree, a lower number of bits to represent the data may be possible.

2. BCWT Coding Unit

Figure 4:
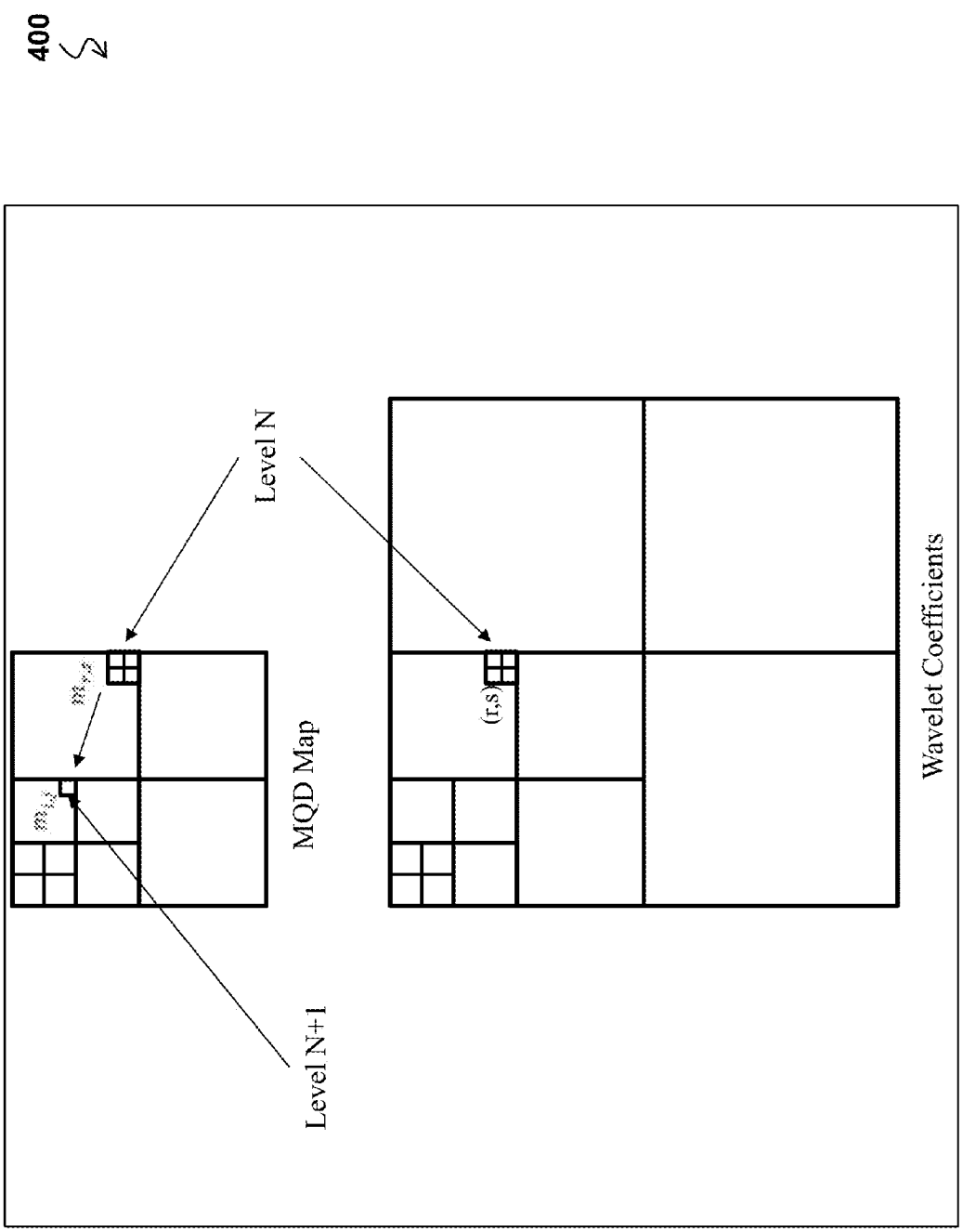
FIG. 4 depicts a two-dimensional BCWT coding of a coding unit.

FIG. 4 illustrates an exemplary BCWT coding unit 400. The coding process comprises recursive coding of many small branches of the wavelet trees, where these branches and their corresponding MQD map may be denoted as BCWT coding units. FIG. 4 depicts an exemplary BCWT coding unit where each coding unit lies in two consecutive wavelet levels, which include four (4) wavelet coefficients and five (5) MQD map nodes. An exemplary encoding algorithm may comprise the following steps: (a) generate the MQD node in level N+1 utilizing the 2×2 block MQD nodes and the 2×2 block wavelet coefficients in level N; (b) encode the 2×2 block wavelet coefficients utilizing all 5 MQD nodes; (c) encode the 2×2 block MQD nodes. There is a recursive coding mechanism for MQD nodes, meaning that MQD used in the current coding unit is generated from coding process of the previous coding unit. In one embodiment, the lowest level MQD nodes may be generated based on the level 1 wavelet coefficients. Since in each coding unit only two levels of wavelet trees are involved, the entire tree need not be stored. Once the coding is finished, most of the data may no longer be needed and may be released from memory. For example, after encoding level N coding unit, the level N MQD and wavelet coefficients are no longer needed, and thus may be discarded where the memory may be used to store new data. Accordingly, a further saving on the memory usage may be achieved via releasing the unneeded memory.

3. One Pass Backward Coding

One embodiment of the BCWT algorithm may implement, for example, a one pass encoding algorithm. That is, the encoding process may be completed with only a one time scan of the wavelet tree. The algorithm starts encoding the coding units from the lowest wavelet level and moves up to the higher wavelet levels. The encoding procedure repeats until the top level is reached. The coefficients in the LL band may then be encoded using a uniform quantization. In the decompressor embodiment, every step in the decoding is in the exact reverse order of the encoding, therefore coefficients and MQD map nodes may be reconstructed from the highest wavelet level to the lowest.

Image Padding

Figure 5:
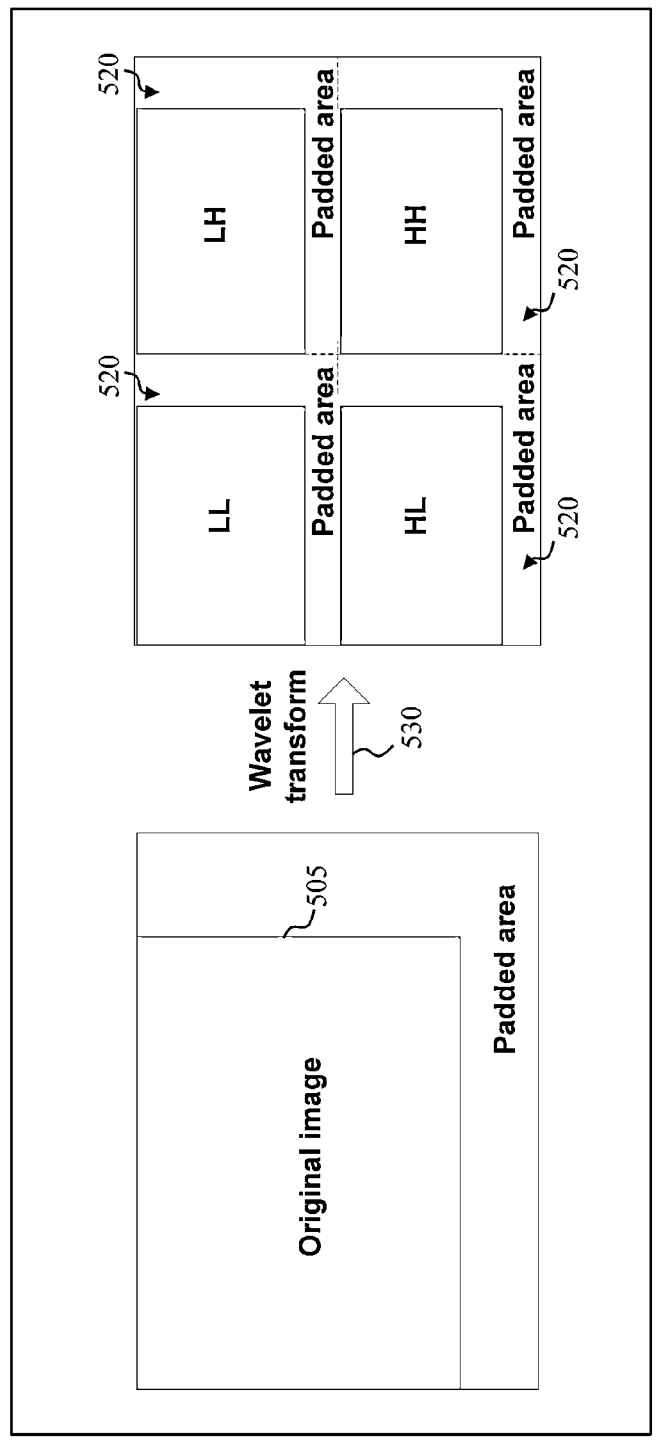
FIG. 5 depicts an exemplary image with a 'set to zeros' method having padded areas after one level wavelet transform.

FIG. 5 illustrates an exemplary image 505 where a 'set to zeros' method is applied to the four (4) padded areas 520 after one level wavelet transform 530. The figure illustrates an embodiment of the wavelet tree CODEC, where before a wavelet transform is performed, the image is extended through mirror padding, which symmetrically extends the original image from the boundaries—in both horizontal and vertical direction. Padding the image according to this method may effectively prevent circular convolution leakage effects during the wavelet transform. In one embodiment, the number of padded samples may be related to the length of the wavelet filter. That is, since both wavelet filters (9/7 and 5/3) are symmetric, after the wavelet transform, the coefficients in the padded area for all four subbands are mirror reflections of the coefficients inside of the image along the edges. In an exemplary embodiment, a 'set to zeros' method to zero the coefficients in the padded area after each level of wavelet transform may be performed, so as to eliminate having to directly encode the coefficients in the padded area, which may have an extra cost of bits.

A 'zero tree detection' scheme in BCWT encoder may efficiently detect and represent these zeros so that they are not encoded. When the decoder performs the inverse wavelet transform, the wavelet coefficients may be mirror padded along the edges to recover the 'zeroed' coefficients. For higher level wavelet transform, similar mirror padding technique may be applied to the LL band coefficients along the appropriate edges. In the embodiment of the 'set to zeros' method, the method in the padded area may ensure minimal added bit cost due to the image padding.

BCWT Encoding Algorithm

An exemplary BCWT encoding algorithm of the image CODEC is disclosed in this section. This exemplary algorithm provides better compression performance by removing the zero trees from the overall tree structure.

The BCWT encoding algorithm is further described in details below.

The symbols used to describe the wavelet tree structure and the coding unit are defined as:

$U(i,j)$: A BCWT coding unit with its root at coordinate $(i,j)$.
$c_{i,j}$: The wavelet coefficient at coordinate $(i,j)$.
$O(i,j)$: A set of coordinates of all the offspring of $(i,j)$.
$D(i,j)$: A set of coordinates of all the descendants of $(i,j)$.
$L(i,j)=D(i,j)-O(i,j)$: A set of coordinates of all the leaves of $(i,j)$.

The quantization levels associated with the wavelet tree are defined as $$q_{i,j} = \begin{cases} \lfloor \log_2 |c_{i,j}| \rfloor, & \text{if } |c_{i,j}| \geq 1: \\ -1, & \text{otherwise} \end{cases}$$

The quantization level of the coefficient $c_{i,j}$.

$q_{min}$: The minimum quantization threshold. $q_{min} \geq 0$. Any bits below $q_{min}$ will not be present at the encoder output.

The node in the MQD map is denoted as $m_{i,j}$, representing the maximum quantization level of all the descendants of the wavelet coefficient $c_{i,j}$, where $(i,j)$ is in level 2 or higher subbands (this is because coefficients in level 1 subbands do not have descendants).

A few operations involved in the encoding algorithm are:
$B(x)$: binary code of $\lfloor |x| \rfloor$, e.g., $B(5.5)=101$
$T(n)$: binary code with a single one at the nth right-most bit ($n \geq 0$), e.g., $T(0)=00000001$, $T(5)=00100000$
$b|_n^m$: section of binary code b, starting from the nth and ending at the mth right-most-bit ($m \geq n \geq 0$), e.g., $00000010|_2^4=000$; $00110110|_2^5=1101$ For an N level 2-D wavelet decomposition, there should be $3N+1$ subbands, which are $HL_1, LH_1, HH_1, HL_2, LH_2, HH_2, \ldots, HL_N, LH_N, HH_N$, and $LL_N$. $LL_N$ is further divided into four small subbands $HL_{N+1}, LH_{N+1}, HH_{N+1}$ and $LL_{N+1}$. The $HL_{N+1}, LH_{N+1}$, and $HH_{N+1}$ subbands in $LL_N$ are used to encode the $HL_N, LH_N$, and $HH_N$ subbands. In one embodiment the notion $S_N$ is made to represents the entirety of the three high frequency subbands at level N. Therefore, $S_1$ represents $HL_1, LH_1$, and $HH_1$ subbands. $S_N$ represents $HL_N, LH_N$, and $HH_N$ subbands. $S_{N+1}$ represents $HL_{N+1}, LH_{N+1}$, and $HH_{N+1}$ subbands.

With all of the above notations and operations the encoding may be summarized below:

1. Encode level 1 high frequency subbands
   1.1. $\forall (i,j) \in S_2$
      1.1.1. $\forall (r,s) \in O(i,j)$: $m_{i,j} = \max_{(r,s) \in O(i,j)} \{q_{r,s}\}$
      1.1.2. if $m_{i,j} \geq q_{min}$, $\forall (r,s) \in O(i,j)$:
         1.1.2.1. Output $B(c_{r,s})|_{q_{min}}^{m_{i,j}}$
         1.1.2.2. If $|c_{r,s}|>0$, output sign $(c_{r,s})$
2. Encode level 2 to level N-1 high frequency subbands:
   2.1. $\forall (i,j) \in S_n (n=3, 4, \ldots, N-1)$
      2.1.1. $q_{L(i,j)} = \max_{(r,s) \in O(i,j)} \{m_{r,s}\}$
      2.1.2. $m_{i,j} = \max\{\max_{(r,s) \in O(i,j)} \{q_{r,s}\}, q_{L(i,j)}\}$
      2.1.3. If $m_{i,j} \geq q_{min}$, $\forall (r,s) \in O(i,j)$:
         2.1.3.1. Output $B(c_{r,s})|_{q_{min}}^{m_{i,j}}$
         2.1.3.2. If $|c_{r,s}|>0$, output sign $(c_{r,s})$
         2.1.3.3. Output $T(q_{L(i,j)})|_{\max(q_{L(i,j)}, q_{min})}^{m_{i,j}}$
         2.1.3.4. If $q_{L(i,j)} \geq q_{min}$, $\forall (r,s) \in O(i,j)$
            2.1.3.4.1. Output $T(m_{r,s})|_{\max(m_{r,s}, q_{min})}^{q_{L(i,j)}}$
   2.2. $n=n+1$. If $n \leq N-1$, go to step 2.1.
3. Encode level N high frequency subbands:
   3.1. $q_{max} = \max\{\max_{(r,s) \in S_N} \{q_{r,s}\}, \max_{(r,s) \in S_N} \{m_{r,s}\}\}$
      3.1.1. Output $B(q_{max})|_0^3$
   3.2. $\forall (i,j) \in S_{N+1}$
      3.2.1. $q_{L(i,j)} = \max_{(r,s) \in O(i,j)} \{m_{r,s}\}$
      3.2.2. $m_{i,j} = \max\{\max_{(r,s) \in O(i,j)} \{q_{r,s}\}, q_{L(i,j)}\}$
      3.2.3. Output $T(m_{i,j})|_{\max(m_{i,j}, q_{min})}^{q_{max}}$
      3.2.4. If $m_{i,j} \geq q_{min}$, $\forall (r,s) \in O(i,j)$:
         3.2.4.1. Output $B(c_{r,s})|_{q_{min}}^{m_{i,j}}$
         3.2.4.2. If $|c_{r,s}|>0$, output sign $(c_{r,s})$
         3.2.4.3. Output $T(q_{L(i,j)})|_{\max(q_{L(i,j)}, q_{min})}^{m_{i,j}}$
         3.2.4.4. If $q_{L(i,j)} \geq q_{min}$, $\forall (r,s) \in O(i,j)$
            3.2.4.4.1. Output $T(m_{r,s})|_{\max(m_{r,s}, q_{min})}^{q_{L(i,j)}}$
4. Encode $LL_N$ subband:
   4.1. $q_{max} = \max_{(r,s) \in LL_N} \{q_{r,s}\}$
      4.1.1. Output $B(q_{max})|_0^3$
   4.2. If $q_{max} \geq q_{min}$, $\forall (i,j) \in LL_{N+1}$
      4.2.1. $\forall (r,s) \in O(i,j)$: $m_{i,j} = \max_{(r,s) \in O(i,j)} \{q_{r,s}\}$
      4.2.2. Output $T(m_{i,j})|_{\max(m_{i,j}, q_{min})}^{q_{max}}$
      4.2.3. if $m_{i,j} \geq q_{min}$, $\forall (r,s) \in O(i,j)$:
         4.2.3.1. Output $B(c_{r,s})|_{q_{min}}^{m_{i,j}}$
         4.2.3.2. If $|c_{r,s}|>0$, output sign $(c_{r,s})$ According to the coding steps, the algorithm starts processing the coding units at the lowest wavelet level. After all the coding units in that wavelet level are processed, the algorithm moves to the next higher wavelet level. Level 1 to N-1 subbands may be encoded differently from level N high frequency subbands. A simple uniform quantization may be used to process the coefficients in the LL subband.

In one embodiment, the $q_{max}$ and $q_{min}$ are encoded in the header. Other information contained in the header may include the image dimension, the number of components, the compression mode, e.g., lossy/lossless, and other optional user control data.

The decoding algorithm may be in the exact reverse of the encoding algorithm. That is, the BCWT algorithm decodes the MQD map nodes and the wavelet coefficients from the highest wavelet level to the lowest wavelet level. For example, first, the LL subband is decoded. After that, level N high frequency subbands are decoded. Lastly, the rest of the high frequency subbands are decoded in the order of $S_N$ to $S_1$.

Zero Tree Detection Scheme

Figure 6:
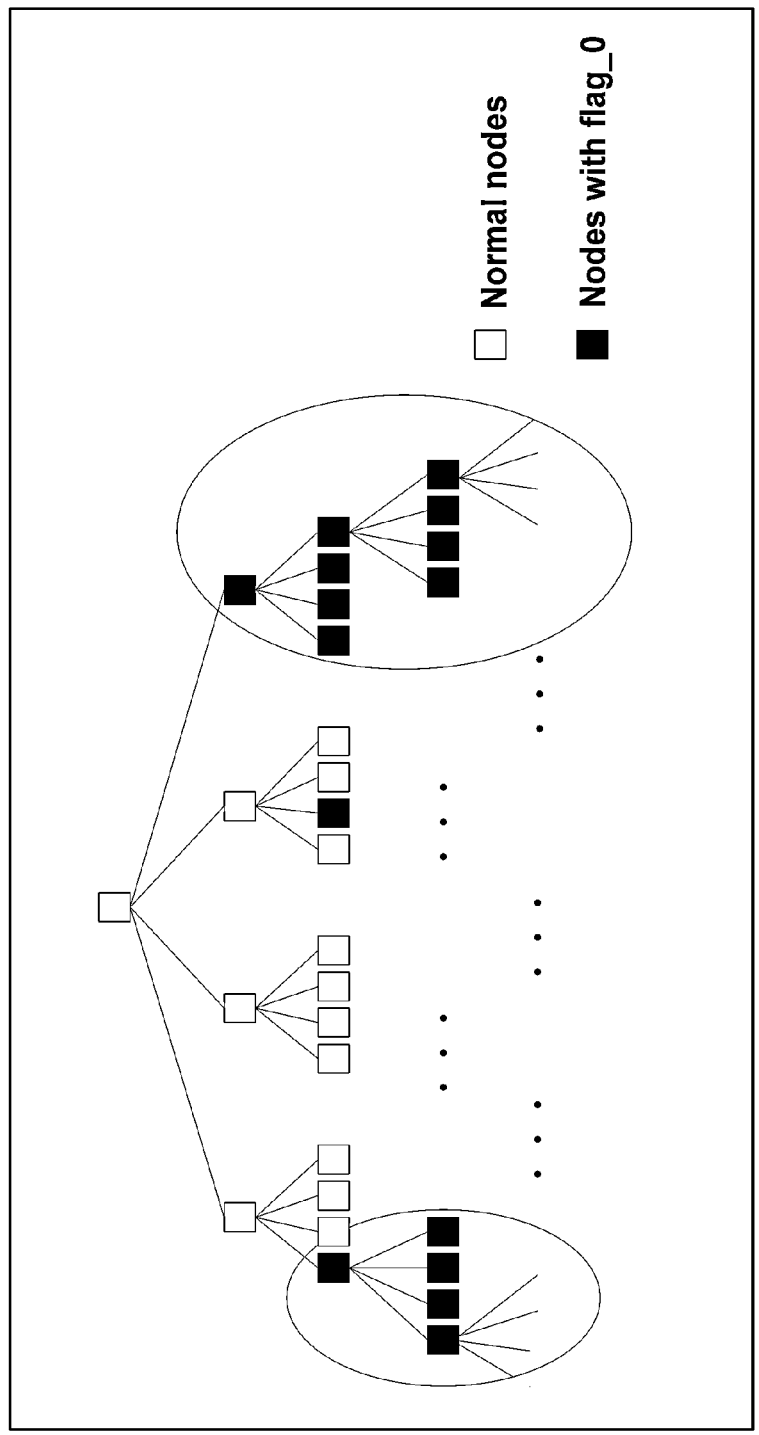
FIG. 6 depicts an exemplary zero tree unit and exemplary node structure.

FIG. 6 depicts an exemplary zero tree unit 600 showing normal nodes and those nodes with a flag_0. In one embodiment, a zero tree unit defines a wavelet-tree node that has all of its descendants having quantization level less than $q_{min}$. If a zero tree unit is detected, all coding units within the zero tree structure are skipped without encoding. All corresponding MQDs are set to −1. Only the topmost MQD of the zero tree is encoded and transmitted. In the decoder, if $m_{i,j}=-1$, which is decoded from the upper level wavelet tree—for the current coding unit—then all four wavelet coefficients are filled with zero and all four MQD are set to $m_{r,s}=-1$ without further processing.

Implementation of Line-Based BCWT

An exemplary implementation of the image CODEC system embodiment, as described in FIG. 1, is to use a line-based wavelet transform. In one embodiment, an exemplary line-based BCWT structure is disclosed to achieve line-based wavelet tree coding. In an embodiment of the line-based wavelet transform, the image may be read into the buffer, i.e., data store, line-by-line. For each image line in the buffer, a one-level 1-D horizontal wavelet transform may be performed. When there are sufficient 1-D wavelet transformed lines in the buffer, a one-level 1-D vertical wavelet transform is performed on those lines. After this operation, the first line of each of the four level 1 wavelet subbands ($LL_1$, $LH_1$, $HL_1$, $HH_1$) is obtained. Then, the first line of each of the $LH_2$, $HL_1$, and $HH_1$ subbands are sent to the BCWT encoder. The first line of the $LL_1$ subband may be sent to the level 2 buffer to be held for further calculation.

Subsequent to the first line of each of the four subbands being sent, the first two lines in the level 0 buffer may be discarded and two new image lines are read into the buffer. One-level horizontal wavelet transform may again be performed on these two lines followed by a one-level vertical wavelet transform. This generates the second line of each of the four level 1 wavelet subbands. The second line of $LH_2$, $HL_1$, $HH_1$ subbands is sent to the BCWT encoder, and the second line of $LL_1$ is sent to the level 2 buffer.

This operation is repeated until there are sufficient lines in the level 2 buffer. Similarly, one-level horizontal and vertical transform are conducted to the level 2 buffer. This yields the first line of each of the four level 2 wavelet subbands ($LL_2$, $LH_2$, $HL_2$, $HH_2$). The first line of each of the $LH_2$, $HL_2$, and $HH_2$ subbands are sent to the BCWT encoder. The first line of the $LL_2$ subband is sent to the level 3 buffer. An N-level wavelet transform may then be achieved via repeating these steps.

As described above, the BCWT encoder may receive the subbands data from the line-based wavelet transform line-by-line and in a non-consecutive fashion, meaning that the next line received after a line from level N could be from any level. Accordingly, an N-level buffer is to be used to store the inputs in the BCWT encoder if an N-level wavelet transform is performed.

Figure 7:
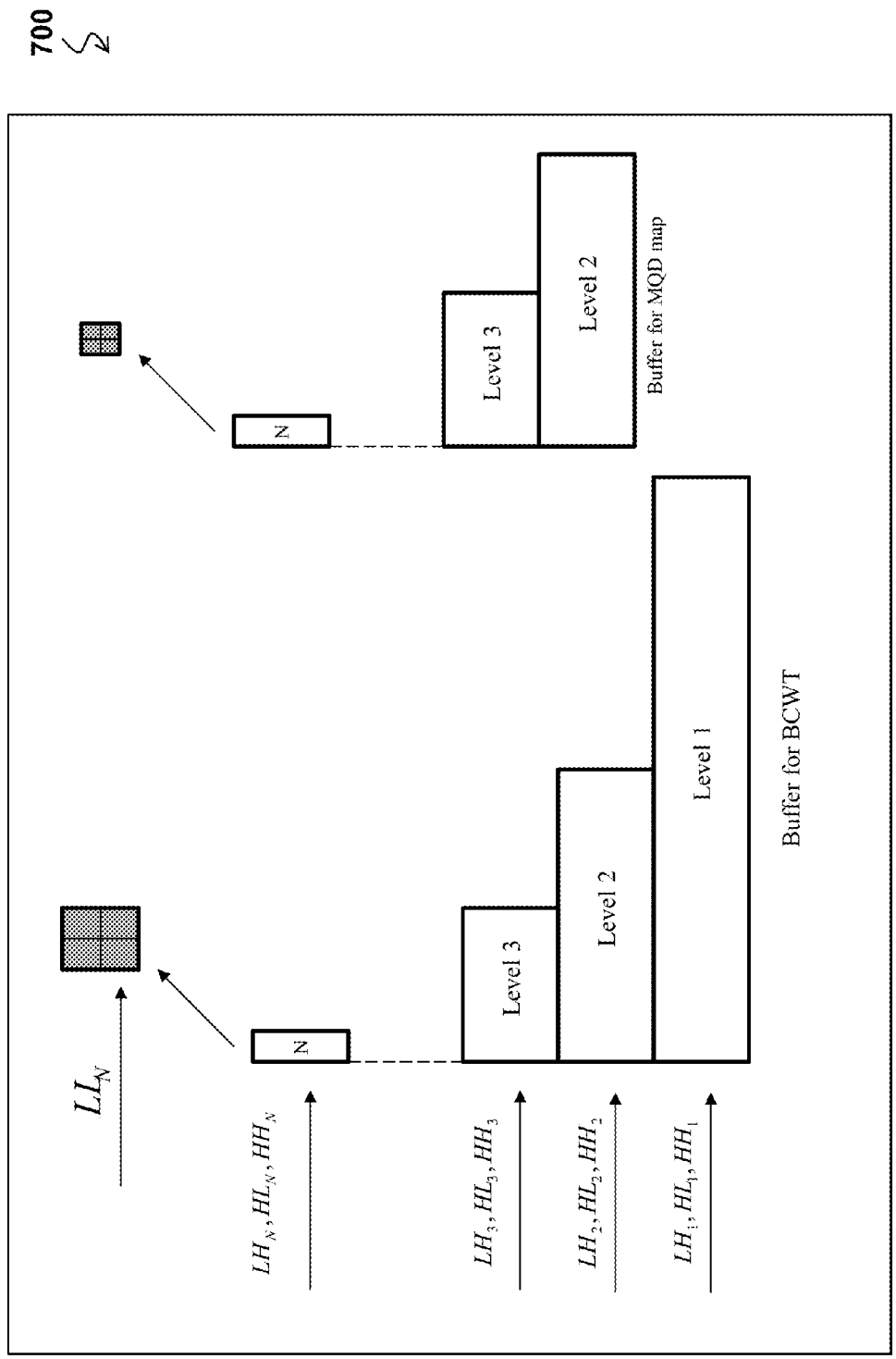
FIG. 7 depicts an exemplary memory allocation scheme for BCWT encoding.

FIG. 7 shows the memory assignments for an exemplary line-based BCWT coding embodiment 700. In some embodiments, the buffer used may be to store the wavelet coefficients and another buffer may be used to store the MQD map. In one embodiment, as soon as there are two lines in the buffer, the BCWT may start encoding the coefficients, since each level BCWT buffer only needs to hold 2 lines, thus the buffer height is 2. In this exemplary embodiment, the width of the level 1 BCWT buffer is 3w/2, where w is the wavelet transformed image width. The level N BCWT buffer has a width of $3w/2^N$. The MQD map starts from level 2, since level 1 wavelet coefficients do not have descendants. The width and height of the MQD map buffer are the same as the MQD map's corresponding level BCWT buffer.

Figure 8:
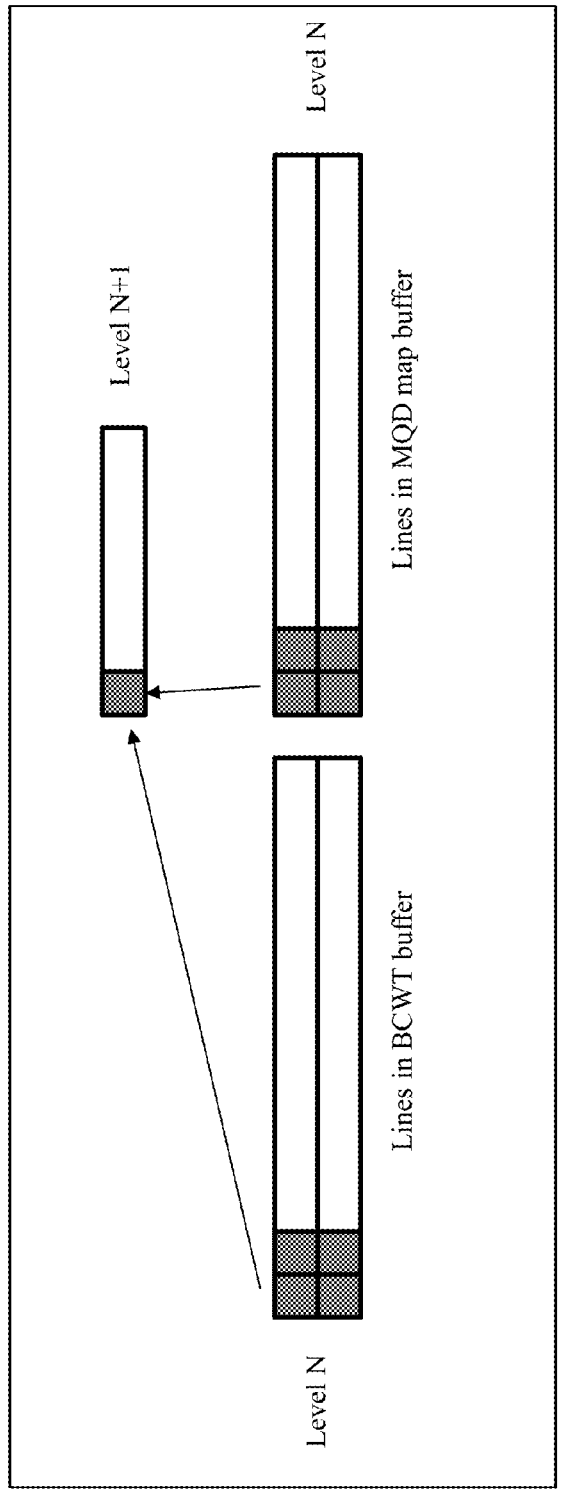
FIG. 8 depicts an exemplary line-based encoding process with buffer usage.

FIG. 8 depicts an exemplary line-based BCWT encoding process 800. In this figure, the gray blocks represent a coding unit, where the 2×2 block of the wavelet coefficients in the level N BCWT buffer and the 2×2 block of the MQD nodes in the level N MQD map buffer may be utilized to generate an MQD node in the level N+1 MQD map buffer and to encode the 2×2 block of wavelet coefficients. Once this process is completed, the encoding process may move to the next coding unit and encode the 2×2 block of wavelet coefficients to the right side of the previously encoded gray 2×2 block of wavelet coefficients in the level N BCWT buffer. After encoding all the coefficients in these two lines in the level N BCWT buffer, a new line for the level N+1 MQD map buffer is generated. After that, these two lines in the level N BCWT buffer may be discarded.

In order to reduce the BCWT memory usage to the best extent, in one embodiment, the buffer usage between different wavelet levels may be synchronized. That is, sufficient lines in the BCWT buffer and MQD buffer are present before performing the BCWT coding to avoid underflow of the buffer. In this embodiment, the BCWT coding may need to be performed whenever the lines in one level of the BCWT buffer are sufficient to avoid overflow of the buffer. The minimum height requirement of each level BCWT buffer to achieve this task is 2.

To encode the $LL_N$ subband, two blocks of memory may be allocated as shown in FIG. 7. For an exemplary w×h size wavelet transformed image, the memory block to store the wavelet coefficients may have a size of $w/2^N \times h/2^N$. In that exemplary wavelet transformed image, the memory block to store the MQD map may have the size of $w/2^{N+1} \times h/2^{N+1}$.

Resolution Scalability Control

Figure 9:
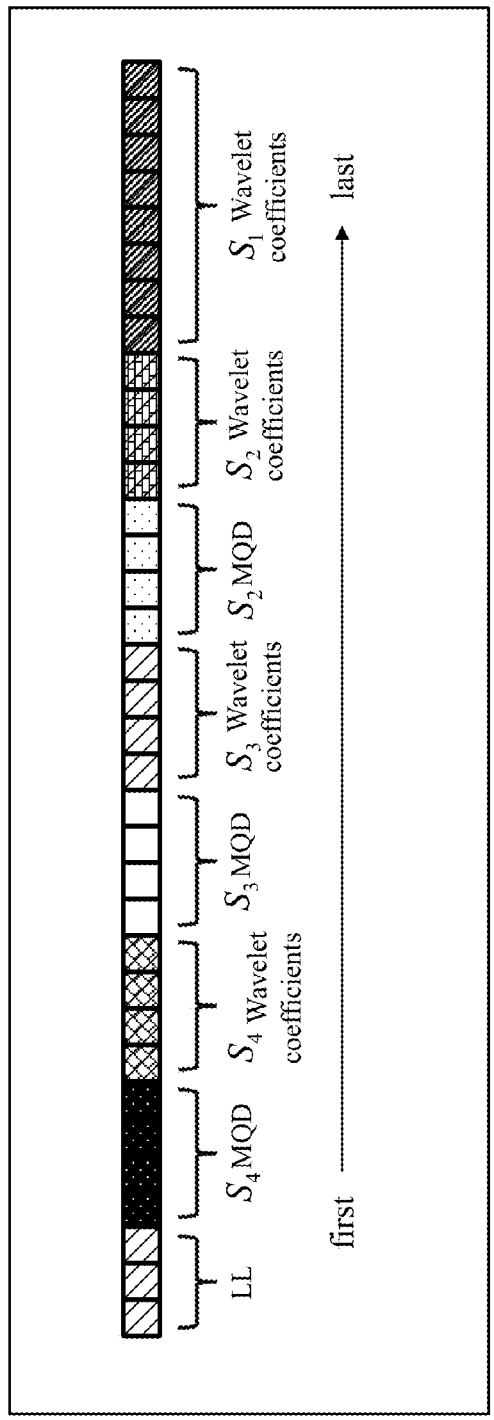
FIG. 9 depicts an exemplary bit stream output order using a wavelet transform.

FIG. 9 depicts an exemplary output order of a bit stream 900 with 4 level discrete wavelet transform (DWT) transform. In one embodiment, because the bits may be generated in the order of lower level coding units to higher level units of the wavelet tree, the coding scheme is inherently resolution scalable. In this embodiment, after all the wavelet coefficients are encoded, the LL band outputs may be transmitted first, then the high frequency subband outputs may be transmitted from $S_N$ subbands down to $S_1$ subbands. In one embodiment, the encoded MQD map and wavelet coefficients may be interleaved in the output bit stream. The received bit stream may be progressive-of-resolution decodable. That is, the decoder may choose to stop decoding at a certain higher level unit and reconstruct a smaller version of the original image, and resume decoding to get a larger version, until the full resolution is reached. In one embodiment, the progressive-resolution decoder may decode, after a smaller part of the whole file has been received, at a lower quality of the final picture; as more data is received at the decoder and decoded, the quality of the picture may improve monotonically.

Region of Interest (ROI) Control

Two exemplary ROI control schemes may be implemented in the image CODEC system, one on the receiver side, and one on the transmitter side. ROI control in the receiver side may allow the user to select any ROI from a low resolution thumbnail of the full image and decode that specific ROI to a desired higher resolution. ROI control in the transmitter side may encode the predefined one or more ROIs with layered resolution, where the resulting bits are much smaller than that of originally encoded high resolution version of the full image. That is, a layered resolution may provide different resolutions at different layers. In one embodiment, this technique is especially suitable for band limited transmission environments.

1. Receiver ROI Control

In order to decode an ROI in an image, a wavelet-based CODEC must decode all the relevant wavelet coefficients. In BCWT, due to the wavelet-tree structure, the wavelet coefficients relevant to—or associated with—an ROI correspond to a wavelet-forest, e.g., a set of neighboring wavelet-trees. Encoded data bits representing the wavelet coefficients in a wavelet-forest may be grouped together in the bit stream and may be referred to as a BCWT forest. To decode an ROI, only the BCWT forests with relevant wavelet coefficients may be extracted from the bit stream and decoded. The receiver ROI capability may be obtained by reorganizing the encoded data bits in the bit stream, and the reorganization may happen after the encoding process, thus no tile-boundary artifacts—due to the discontinuity between adjacent BCWT forests—may appear.

2. Transmitter ROI Control

Broadcasting live videos are receiving more and more attention due to the rapidly increased free wireless coverage for users. However, due to limited bandwidth, high resolution videos may not always be available. Intermittent videos or low resolution videos are certainly less entertaining. In most cases, the user may only be interested in a particular region of the video while care little or even nothing about the video outside of that region. For example, at a baseball game, fans will want to watch the pitches very closely around the plate to judge balls and strikes, while not caring much about other background details. In these exemplary environments, the proposed ROI control technique allows the user to stream the video with selective resolutions in different regions.

In an environment where streaming of the video with selective resolution is desired, the ROI control technique may be implemented. In one embodiment, after the wavelet transform, an ROI mask may be applied to the transformed image. The ROI mask follows the same wavelet-tree structure but comprises only binary data. Similar to the wavelet transformed image, the ROI mask may be partitioned into BCWT forests, within which, it is partitioned into different decomposition levels. In this exemplary embodiment, all BCWT forests relevant to an ROI in the ROI mask are set to 1. For BCWT forests not relevant to an ROI, only positions within the LL band and the upper decomposition levels are set to 1, all other positions are set to 0. A transmitted ROI embedded image may be generated by multiplying the ROI mask to the wavelet transformed image. Since in the non ROI, i.e., region of no interest, most of the high frequency wavelet coefficients are zeroed by the ROI mask, the associated zero-tree units may be skipped without encoding, and thereby resulting in reduced output bits.

In this embodiment, the decoder may not need to take any additional steps in order to decode the image. The decoder therefore decodes the ROI embedded image just like normal images. In the reconstructed image, within the ROI, the image may be viewed with full resolution. Outside of ROI, the image is reconstructed with lower resolution. If desired, the ROI control may be adapted to mask the transformed image with multi-level resolution. For example, the BCWT forests may be partitioned into ROI, non ROI 1, and non ROI 2. The user may then assign different resolution levels to mask non ROI 1 and non ROI 2. Optionally, a few ROIs in the ROI mask, if more than one region is of interest to the users, may be assigned.

Figure 10:
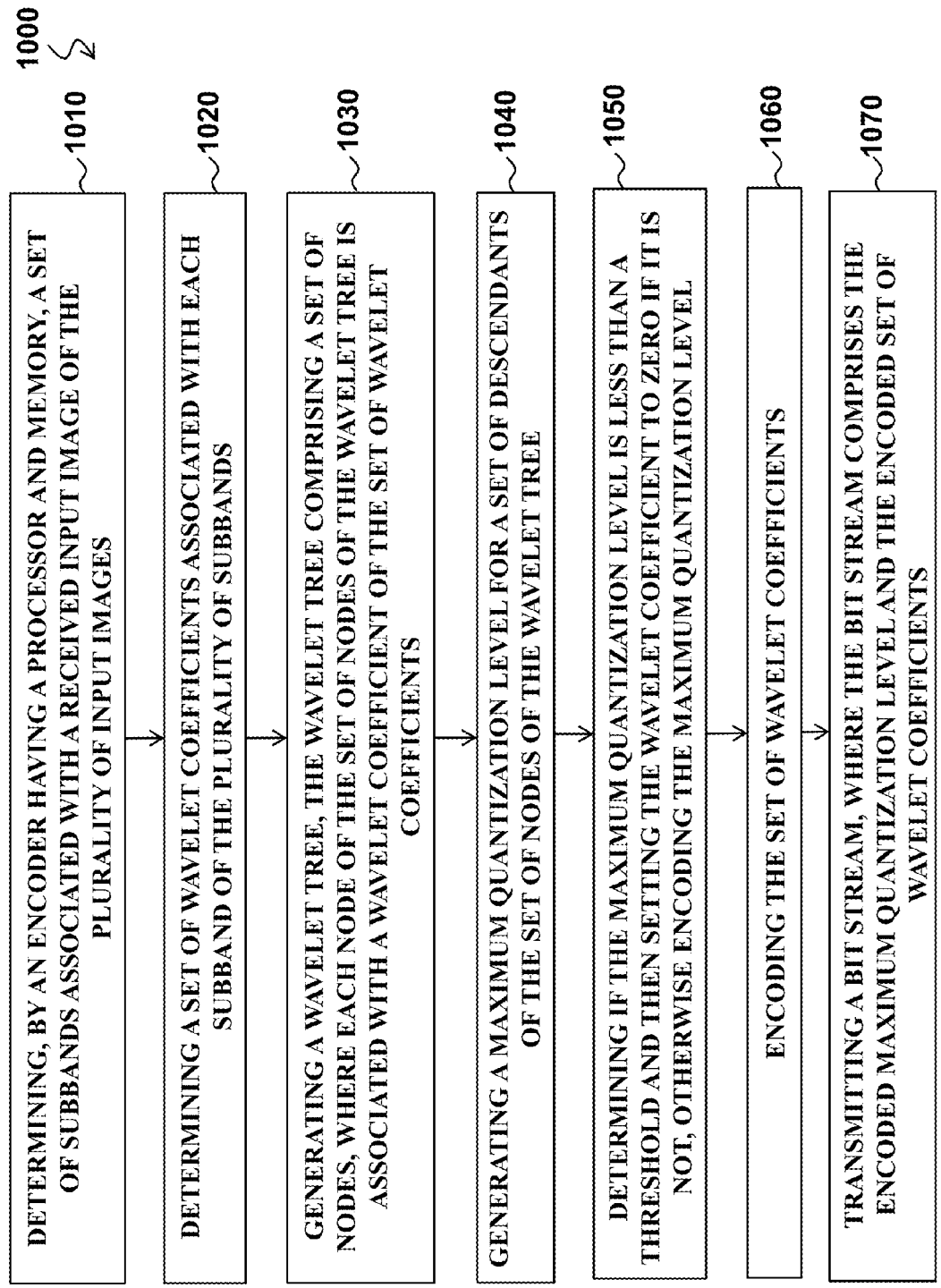
FIG. 10 depicts, in a top-level flowchart, an exemplary method of implementation of the image CODEC function.

Embodiments may include an exemplary method of implementation of a CODEC system 1000, as illustrated in a top-level flowchart of FIG. 10. The exemplary steps of the system and associated computing devices may comprise the following steps: (a) determining, by an encoder having a processor and memory, a set of subbands associated with a received input image of the plurality of input images (step 1010); (b) determining a set of wavelet coefficients associated with each subband of the plurality of subbands (step 1020); (c) generating, by the processor, a wavelet tree, the wavelet tree comprising a set of nodes, where each node of the set of nodes of the wavelet tree is associated with a wavelet coefficient of the set of wavelet coefficients (step 1030); (d) generating, by the processor, a maximum quantization level for a set of descendants of the set of nodes of the wavelet tree (step 1040); (e) determining, by the processor, if the maximum quantization level is less than a threshold and then setting the wavelet coefficient to zero if it is not, otherwise encoding the maximum quantization level (step 1050); (f) encoding the set of wavelet coefficients (step 1060); and (g) transmitting a bit stream, where the bit stream comprises the encoded maximum quantization level and the encoded set of wavelet coefficients (step 1070).

Figure 11:
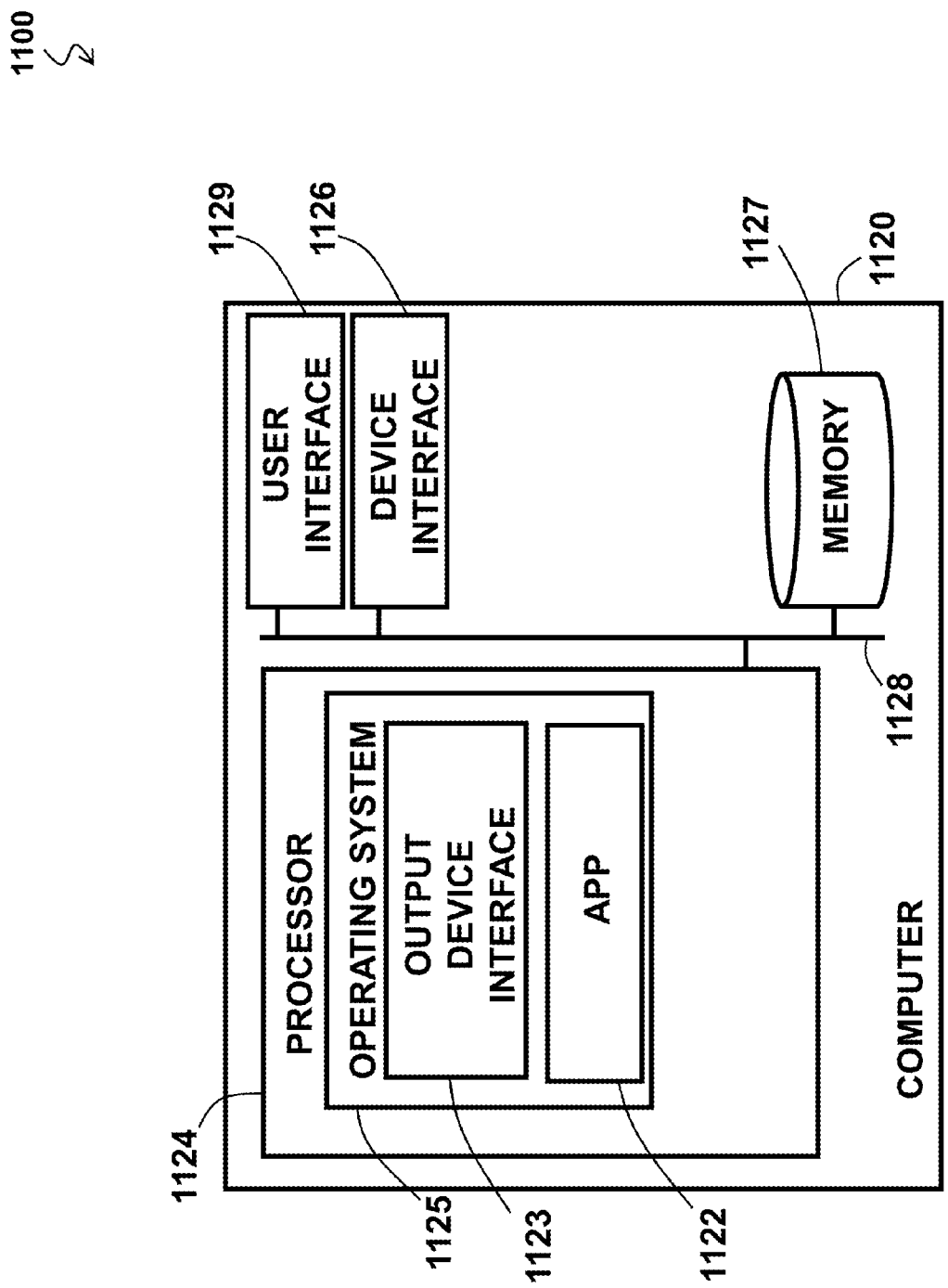
FIG. 11 depicts an exemplary top level functional block diagram of a computing device embodiment.

FIG. 11 illustrates an exemplary top level functional block diagram of a wavelet-based image CODEC system 1100 comprising a plurality of computing devices. The exemplary operating environment is shown as a computing device 1120 comprising a processor 1124, such as a central processing unit (CPU); an addressable memory 1127, such as a lookup table having an array; an external device interface 1126, such as an optional universal serial bus port and related processing, and/or an Ethernet port and related processing; an output device interface 1123; an application processing kernel 1122; and an optional user interface 1129, such as an array of status lights, and/or one or more toggle switches, and/or a display, and/or a keyboard and/or a pointer-mouse system and/or a touch screen. A user interface may also have at least one user interface element. Examples of user interface elements comprise: input devices including manual input such as buttons, dials, keyboards, touch pads, touch screens, mouse and wheel related devices, and voice and line-of-sight interpreters. Additional examples of user interface elements comprise output devices including displays, tactile feedback devices, and auditory devices. Optionally, the addressable memory may, for example, be: flash memory, SSD, EPROM, and/or a disk drive and/or another storage medium. These elements may be in communication with one another via a data bus 1128. An operating system 1125, such as one supporting the execution of applications, may comprise a processor 1124 which may be configured to execute steps of a process of a wavelet-based image CODEC system according to the exemplary embodiments described above where the system generates a wavelet tree for an input image, the wavelet tree having a plurality of coefficients, and where each of the plurality of coefficients is associated with a node of the wavelet tree; additionally, the system may determine a maximum quantization level associated with a set of descendants of the node of the wavelet tree and then encode the blocks of wavelet coefficients along with the blocks of maximum quantization level associated with the set of descendants.

Optionally, embodiments may, instead of buffering the entire image for a DWT to operate, start computing the wavelet coefficients with only a few lines of the image present in the buffer. This significantly alleviates the burden of memory usage due to the wavelet transform and makes the wavelet-based image compression algorithm more realistic for implementation.

Exemplary image CODECs utilizing a wavelet transform scheme to achieve wavelet-based coding may use different algorithms—which at their core—may divide the wavelet coefficients into small blocks that are encoded independently. This independent block coding feature may allow for a smooth integration with line-based wavelet transform embodiments.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A method comprising:
receiving a plurality of input images;
determining, by an encoder having a processor and memory, a set of subbands associated with an input image of the plurality of input images;
determining a set of wavelet coefficients associated with each subband of the plurality of subbands;

generating, by the processor, a wavelet tree, the wavelet tree comprising a set of nodes, wherein each node of the set of nodes of the wavelet tree is associated with a wavelet coefficient of the set of wavelet coefficients;

generating, by the processor, a maximum quantization level for a set of descendants of the set of nodes of the wavelet tree;

determining, by the processor, if the maximum quantization level is less than a threshold and then setting the wavelet coefficient to zero if it is not, otherwise encoding the maximum quantization level;

encoding the set of wavelet coefficients; and transmitting a bit stream, wherein the bit stream comprises the encoded maximum quantization level and the encoded set of wavelet coefficients.

2. The method of claim 1 wherein the encoded maximum quantization level and the encoded wavelet coefficients are interleaved in the output bit stream for transmission.

3. The method of claim 1 wherein a buffer size to store inputs to the encoder is equal to the number of levels of a wavelet transform.

4. The method of claim 1 wherein a buffer size to store a map of the maximum quantization level for a set of descendants of the set of nodes of the wavelet tree is equal to one less than the number of levels of a wavelet transform.

5. The method of claim 1 wherein the wavelet coefficients is encoded with a number of bits proportional to their magnitude level.

6. The method of claim 1 wherein for each wavelet coefficient of the set of wavelet coefficients, only the bits from the minimum quantization threshold, up to the node value of the wavelet coefficient maximum quantization level of its descendant is transmitted.

7. The method of claim 1 wherein the output bit stream is reorganized to provide a progressive-resolution decoding feature at a decoder device.

8. The method of claim 1 wherein the output bit stream is partitioned to provide region of interest view at a receiver device.

9. The method of claim 1 wherein a region of interest control technique is integrated in the codec device thereby allowing a user to transmit images with layered resolution.

10. The method of claim 1 wherein the encoding the set of wavelet coefficients is via dividing the coefficients into a block of data.

11. A system comprising:

an encoding device, having a processor and memory, operably coupled to a decoder via a transport medium, the encoding device configured to:

receive a plurality of input images;

determine a set of subbands associated with an input image of the plurality of input images;

determine a set of wavelet coefficients associated with each subband of the plurality of subbands;

generate a wavelet tree, the wavelet tree comprising a set of nodes, wherein each node of the set of nodes of the wavelet tree is associated with a wavelet coefficient of the set of wavelet coefficients;

generate a maximum quantization level for a set of descendants of the set of nodes of the wavelet tree;

determine if the maximum quantization level is less than a threshold and then set the wavelet coefficient to zero if it is not, otherwise encode the maximum quantization level; and encode the set of wavelet coefficients;

a quantization device configured to perform quantization on the set of wavelet coefficients;

an output interface configured to:

generate a bit stream based on a received region of interest control flag and a received scalability control flag; and transmit the generated bit stream, wherein the generated bit stream comprises the encoded maximum quantization level and the encoded set of wavelet coefficients;

a decoding device configured to decode the received encoded bit stream.

* * * * *